(12) United States Patent
Meier et al.

(10) Patent No.: US 11,626,995 B2
(45) Date of Patent: Apr. 11, 2023

(54) AUTOMATIC MESSAGE ASSEMBLY DURING A CRYPTOGRAPHIC OPERATION

(71) Applicant: Infineon Technologies AG, Neubiberg (DE)

(72) Inventors: Manuela Meier, Munich (DE); Andreas Graefe, Munich (DE)

(73) Assignee: Infineon Technologies AG, Neubiberg (DE)

( * ) Notice: Subject to any disclaimer, the term of this patent is extended or adjusted under 35 U.S.C. 154(b) by 77 days.

(21) Appl. No.: 16/948,690

(22) Filed: Sep. 29, 2020

(65) Prior Publication Data

US 2022/0103368 A1 Mar. 31, 2022

(51) Int. Cl.
*H04L 9/32* (2006.01)
*H04L 9/08* (2006.01)
*H04L 9/06* (2006.01)

(52) U.S. Cl.
CPC .......... *H04L 9/3242* (2013.01); *H04L 9/0618* (2013.01); *H04L 9/0897* (2013.01)

(58) Field of Classification Search
CPC ... H04L 9/3242; H04L 9/0618; H04L 9/0897; H04L 9/0643; H04L 2209/12; G09C 1/00
See application file for complete search history.

(56) References Cited

U.S. PATENT DOCUMENTS

| | | | | |
|---|---|---|---|---|
| 2002/0191793 | A1* | 12/2002 | Anand | G06F 21/72 380/255 |
| 2007/0154018 | A1* | 7/2007 | Watanabe | H04L 63/0478 380/273 |
| 2021/0089388 | A1* | 3/2021 | Makaram | G06F 21/64 |
| 2021/0165916 | A1* | 6/2021 | Abhyankar | G06F 21/606 |

\* cited by examiner

*Primary Examiner* — Philip J Chea
*Assistant Examiner* — Sangseok Park
(74) *Attorney, Agent, or Firm* — Harrity & Harrity, LLP (57) ABSTRACT

A cryptographic accelerator may include an input buffer to store an additional authenticated data (AAD) portion of a message and a plain text portion of the message. The cryptographic accelerator may include a cryptographic engine to generate cipher text using the plain text portion of the message, generate a message authentication code (MAC) using the AAD portion and either the plain text portion or the cipher text, determine a configuration for creating an assembled message in an output buffer of the cryptographic accelerator, and provide at least the cipher text to the output buffer to create the assembled message in the output buffer according to the configuration. The cryptographic accelerator may include the output buffer to provide the assembled message.

21 Claims, 9 Drawing Sheets

AUTOMATIC MESSAGE ASSEMBLY DURING A CRYPTOGRAPHIC OPERATION

BACKGROUND

A message in a secure communication environment in some cases includes at least two parts—an additional authenticated data portion (AAD) that is authenticated only, and a plain text portion that is both authenticated and encrypted. A cryptographic operation that performs this authenticated encryption is referred to as an authenticated encryption with associated data (AEAD). AEAD can be used to simultaneously assure confidentiality and authenticity of data. Generally, the AAD portion includes message header information, while the plain text portion includes a message payload.

In some cases, the message may further include a message authentication code (MAC). The MAC (also referred to as a tag) is used to authenticate the message. That is, the MAC may be used to confirm authenticity of the message (i.e., that the message came from the stated sender) and that the message has not been altered. A value of the MAC protects both integrity of message data and authenticity of the message by allowing verifiers to detect any changes to the message.

SUMMARY

In some implementations, a cryptographic accelerator includes an input buffer to store an AAD portion of a message and a plain text portion of the message; a cryptographic engine to generate cipher text using the plain text portion of the message, generate a MAC using the AAD portion and either the plain text portion or the cipher text, determine a configuration for creating an assembled message in an output buffer of the cryptographic accelerator, and provide at least the cipher text to the output buffer to create the assembled message in the output buffer according to the configuration; and the output buffer to provide the assembled message.

In some implementations, a system includes a cryptographic accelerator to store an AAD portion of a message and a plain text portion of the message in an input buffer, generate cipher text using the plain text portion of the message, generate a MAC using the AAD portion and either the plain text portion or the cipher text, create an assembled message in an output buffer of the cryptographic accelerator, the assembled message being created based on a configuration and including at least the cipher text, and provide the assembled message for transmission; and a communication component to receive the assembled message, and transmit the assembled message.

In some implementations, a method includes storing an AAD portion of a message and a plain text portion of the message in an input buffer; generating cipher text using the plain text portion of the message; generating a MAC using the AAD portion and either the plain text portion or the cipher text; assembling a secure message in an output buffer of a cryptographic accelerator, the secure message being assembled based on a configuration associated with a communication protocol to be used to transmit the secure message, wherein assembling the secure message in the output buffer includes providing at least the cipher text to the output buffer; and providing the secure message for transmission.

In some implementations, a cryptographic accelerator includes an input buffer to store an AAD portion of a message and a plain text portion of the message; a cryptographic engine to: generate a MAC using the AAD portion and the plain text portion, determine a configuration for creating an assembled message in an output buffer of the cryptographic accelerator, and provide the AAD portion, the plain text portion, and the MAC to create the assembled message in the output buffer according to the configuration; and the output buffer to provide the assembled message.

DETAILED DESCRIPTION

The following detailed description of example implementations refers to the accompanying drawings. The same reference numbers in different drawings may identify the same or similar elements.

A cryptographic accelerator typically generates a secure message using an AAD portion of a message and a plain text portion of the message. Typically, the AAD portion of the message is consumed by a cryptographic operation performed using the AAD portion, and an output of the cryptographic operation includes cipher text and a MAC. For transmission, the AAD portion, the cipher text, and the MAC should be assembled (to form an assembled message) for sending the secure message to, for example, a communication component. In some cases, the message can be assembled in a memory (e.g., a random access memory (RANI) of a system including the cryptographic accelerator). However, such assembly requires multiple data transfers in the system and, therefore, consumes system resources (e.g., a bus, a direct memory access (DMA), or the like).

One technique to address this issue is to transfer the message parts using a central processing unit (CPU) of the system by executing copy-routines to transfer the AAD from the memory, and the cipher text and MAC from the cryptographic accelerator, into the communication component. However, this technique increases load on the CPU. Another technique to address this issue is to use either a scatter-gather DMA to copy the parts of the message from the different locations, or to concatenate the message parts in the memory before the DMA transfers the message from the memory into the communication component. However, such techniques increase complexity of the DMA. For example, the DMA may require a relatively complex linked-list configuration.

Some implementations described herein enable automatic message assembly during a cryptographic operation. In some implementations, a cryptographic accelerator includes an input buffer to store an AAD portion of a message and a plain text portion of the message. The cryptographic accelerator further includes a cryptographic engine to generate cipher text using the plain text portion of the message and generate a MAC using the AAD portion and either the plain text portion or the cipher text. In some implementations, the cryptographic engine determines a configuration for creating an assembled message in an output buffer of the cryptographic accelerator, and then provides one or more message parts (e.g., at least the cipher text) to the output buffer to create the assembled message in the output buffer according to the configuration. The output buffer may then provide the assembled message (e.g., to a communication component).

In this way, the cryptographic accelerator described herein enables assembly of a secure message in an output buffer of the cryptographic accelerator in a flexible manner. By providing for flexible assembly of the message in the output buffer, the cryptographic accelerator enables a relatively simple, non-scatter-gather DMA to be used to directly transfer the message from the cryptographic accelerator to the communication component. Further, the cryptographic accelerator described herein reduces a number of data transfers needed to generate a message (e.g., by reducing load on the CPU and/or by decreasing a complexity of the DMA configuration), while increasing throughput of a system bus. Additionally, the cryptographic accelerator described herein improves flexibility for software handling.

FIGS. 1A-1E are diagrams illustrating examples of automatic message assembly during a cryptographic operation, in accordance with various aspects of the present disclosure.

Figure 1A:
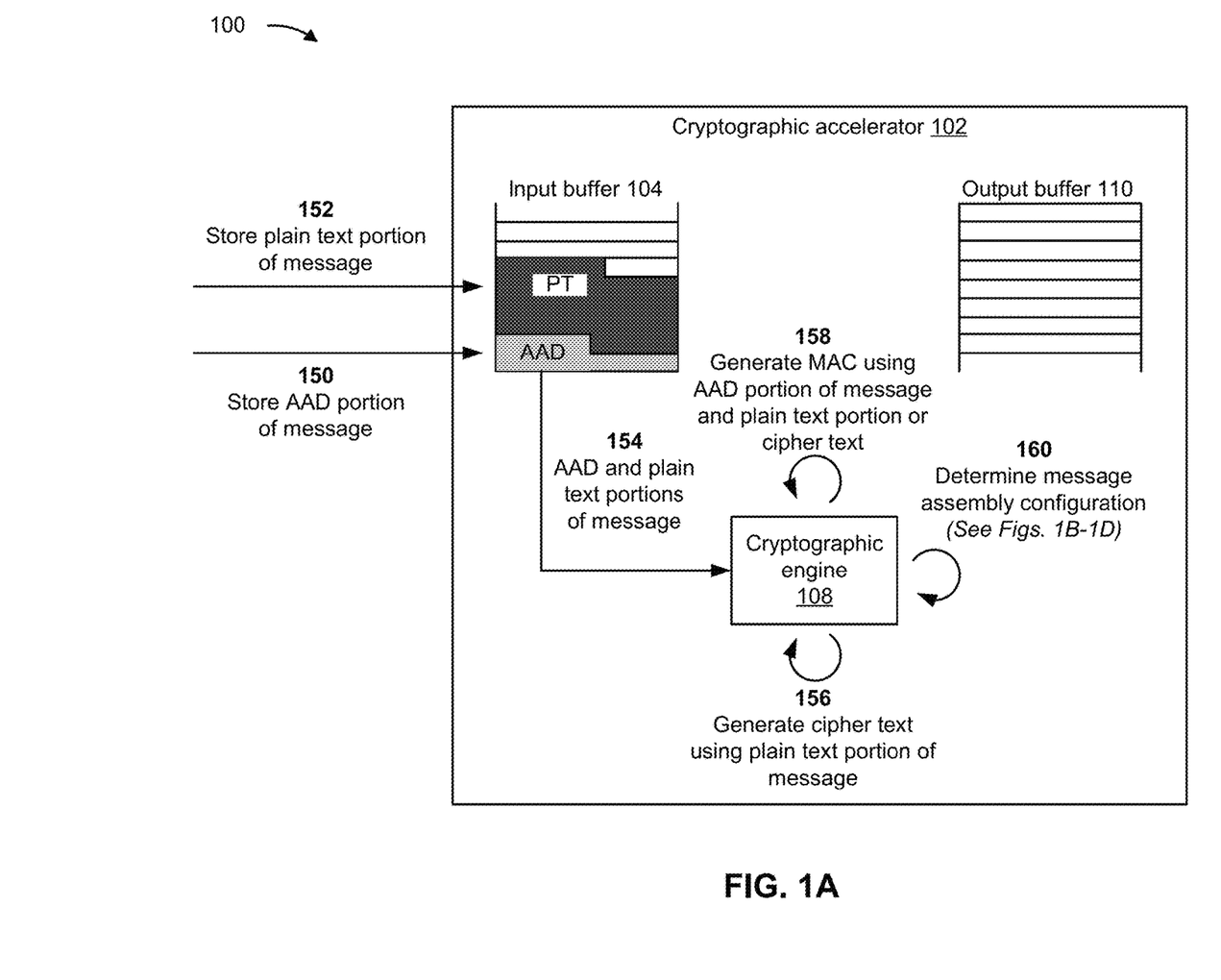
FIGS. 1A-1E are diagrams illustrating examples associated with automatic message assembly during a cryptographic operation, in accordance with various aspects of the present disclosure.

As shown in FIGS. 1A-1E, example 100 includes a cryptographic accelerator 102. In some implementations, cryptographic accelerator 102 may be a component in a system, such as a system on a chip (SoC). As shown in FIG. 1A, cryptographic accelerator 102 may comprise an input buffer 104, a cryptographic engine 108, and an output buffer 110. Descriptions of cryptographic accelerator 102 and the various components of cryptographic accelerator 102 are provided below, followed by a description of an example of operation of the cryptographic accelerator 102.

Cryptographic accelerator 102 is a component that performs cryptographic operations for the system. In some implementations, cryptographic accelerator 102 may be a co-processor of the system. In some implementations, cryptographic accelerator 102 improves performance of the system by providing hardware for performance of cryptographic operations (rather than cryptographic operations being performed by software and/or by a general purpose central processing unit (CPU) of the system).

Input buffer 104 is a component of cryptographic accelerator 102 that holds data received by the cryptographic accelerator 102 prior to the data being processed by one or more other components of cryptographic accelerator 102. For example, input buffer 104 may store one or more portions of a message, such as an AAD portion and a plain text portion, prior to the one or more portions of the message being used for a performance of a cryptographic operation by cryptographic engine 108 of cryptographic accelerator 102. In some implementations, input buffer 104 may be a FIFO-based buffer.

Cryptographic engine 108 is a component of cryptographic accelerator 102 to perform a cryptographic operation using portions of data held by input buffer 104 and create an assembled message in output buffer 110 of cryptographic accelerator 102, as described herein. In some implementations, cryptographic engine 108 may include an advanced encryption standard (AES) engine.

Output buffer 110 is a component of cryptographic accelerator 102 that holds data to be transmitted by cryptographic accelerator 102 after the data is processed by one or more other components of cryptographic accelerator 102. For example, output buffer 110 may store an assembled message created by cryptographic engine 108. In some implementations, output buffer 110 may be a first-in first-out (FIFO)-based buffer.

In an example operation, starting with reference 150, input buffer 104 may store an AAD portion of a message. For example, cryptographic accelerator 102 may receive the AAD portion of the message via a DMA component of the system (not shown), and input buffer 104 may store the AAD portion.

As shown by reference 152, input buffer 104 may further store a plain text (PT) portion of the message. For example, cryptographic accelerator 102 may receive the plain text portion of the message via a DMA component of the system (not shown), and input buffer 104 may store the plain text portion.

As shown by reference 154, cryptographic engine 108 may obtain the AAD portion of the message and the plain text portion of the message. For example, cryptographic engine 108 may read the AAD portion of the message from input buffer 104 and may read the plain text portion of the message from input buffer 104. As another example, another component of cryptographic accelerator 102 may read the AAD portion of the message and/or the plain text portion of the message, and may provide the AAD portion of the message and/or the plain text portion of the message to cryptographic engine 108 (e.g., after some processing of the AAD portion of the message and/or the plain text portion of the message).

As shown by reference 156, cryptographic engine 108 may generate cipher text using the plain text portion of the message. For example, cryptographic engine 108 may provide the plain text portion of the message as an input to a cryptographic algorithm configured on cryptographic engine 108, and may obtain cipher text as an output of the cryptographic algorithm, the cipher text being a version of the plain text that has been encrypted. In some implementations, cryptographic engine 108 may generate the cipher text according to a set of cryptographic configuration parameters configured for cryptographic engine 108. For example, software associated with cryptographic accelerator 102 may configure cryptographic accelerator 102 with a set of parameters to be used in association with performing a cryptographic operation based on the AAD portion of the message and the plain text portion of the message. In some implementations, the set of parameters include one or more parameters associated with performing the cryptographic operation, such as an indication of a type of cryptography to be used, an indication of a key to be used, or the like.

As shown by reference 158, cryptographic engine 108 may generate a MAC using the AAD portion of the message and either the plain text portion of the message or the cipher text. For example, cryptographic engine 108 may provide the plain text portion of the message and the AAD portion of the message as an input to a MAC algorithm configured on cryptographic engine 108 and may obtain the MAC as an output of the MAC algorithm. As another example, cryptographic engine 108 may provide the cipher text and the AAD portion of the message as an input to a MAC algorithm configured on cryptographic engine 108 and may obtain the MAC as an output of the MAC algorithm. In some implementations, the MAC is generated according to the set of cryptographic configuration parameters configured for cryptographic engine 108, described above.

As shown by reference 160, cryptographic engine 108 may determine a configuration for creating an assembled message in output buffer 110 of cryptographic accelerator 102. The configuration for creating the assembled message in output buffer 110 (herein referred to as a message assembly configuration) is a configuration including information that identifies one or more parts to be included in a message assembled in output buffer 110. In some implementations, cryptographic engine 108 may determine the message assembly configuration based on a communication protocol to be used to transmit the assembled message. For example, cryptographic engine 108 may have access to information that maps each of a set of communication protocols to a respective message assembly configuration. Here, cryptographic engine 108 may identify (e.g., based on an explicit or implicit indication in the set of cryptographic configuration parameters) a communication protocol to be used to transmit the assembled message, and may determine the configuration for creating the assembled message based on the identified communication protocol. In some implementations, the cryptographic engine 108 may determine the message assembly configuration based on the set of cryptographic configuration parameters (e.g., when the set of cryptographic configuration parameters includes the message assembly configuration).

Figure 1B:
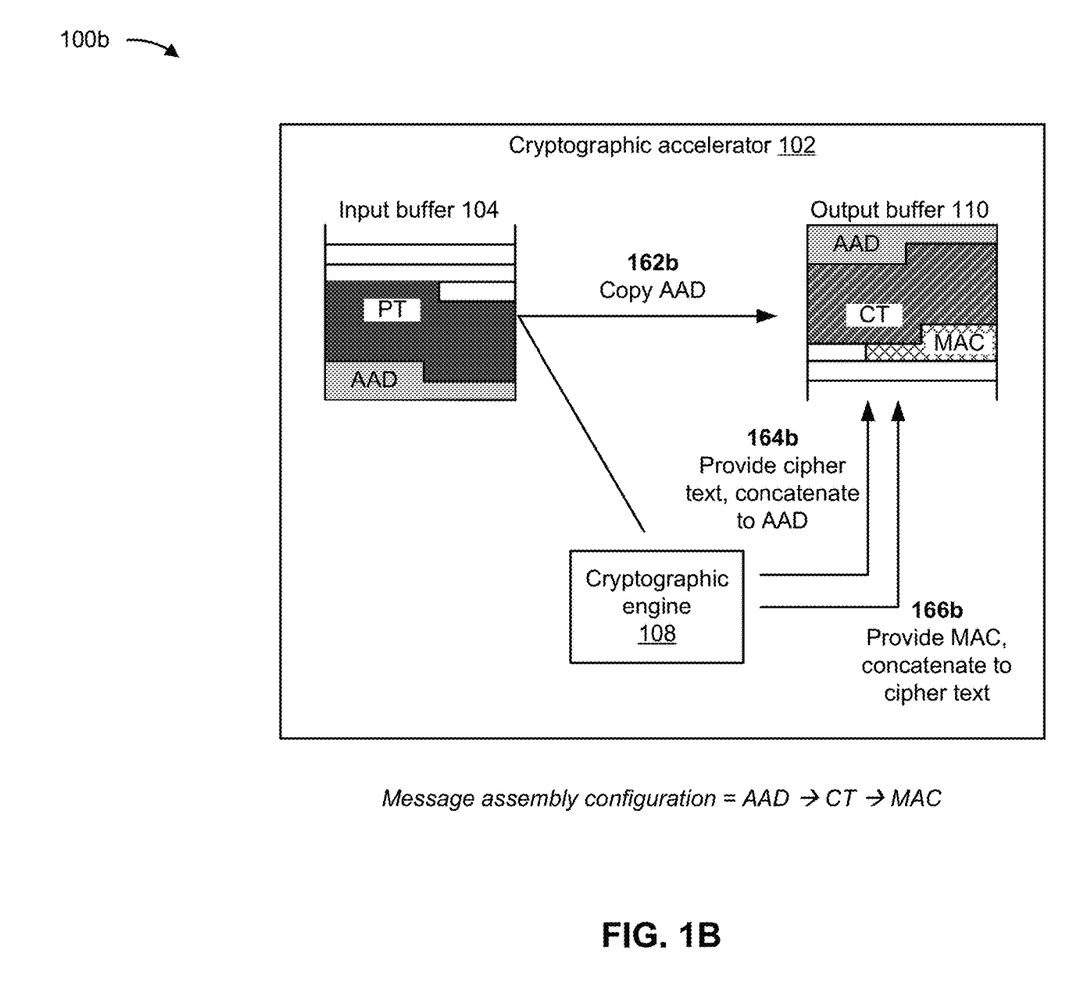

In some implementations, the message assembly configuration indicates that the assembled message is to consist of the AAD portion, the cipher text, and the MAC. FIG. 1B illustrates message assembly in an example 100b in which the message assembly configuration indicates that the assembled message is to consist of the AAD portion, the cipher text, and the MAC.

As shown by reference 162b, based on the message assembly configuration indicating that the assembled message is to consist of the AAD portion, the cipher text, and the MAC, cryptographic engine 108 may copy the AAD portion, or cause the AAD portion to be copied, to output buffer 110. As shown by reference 164b, cryptographic engine 108 may then provide the cipher text to output buffer 110. Here, cryptographic engine 108 provides the cipher text to output buffer 110 such that the cipher text is concatenated to the AAD portion in output buffer 110. As shown by reference 166b, cryptographic engine 108 may then provide the MAC to output buffer 110. Here, cryptographic engine 108 provides the MAC to output buffer 110 such that the MAC is concatenated to the cipher text in output buffer 110. In this way, cryptographic engine 108 may create the assembled message in output buffer 110 such that the assembled message consists of the AAD portion, the cipher text, and the MAC, with the cipher text being concatenated to the AAD portion and the MAC being concatenated to the cipher text.

Figure 1C:
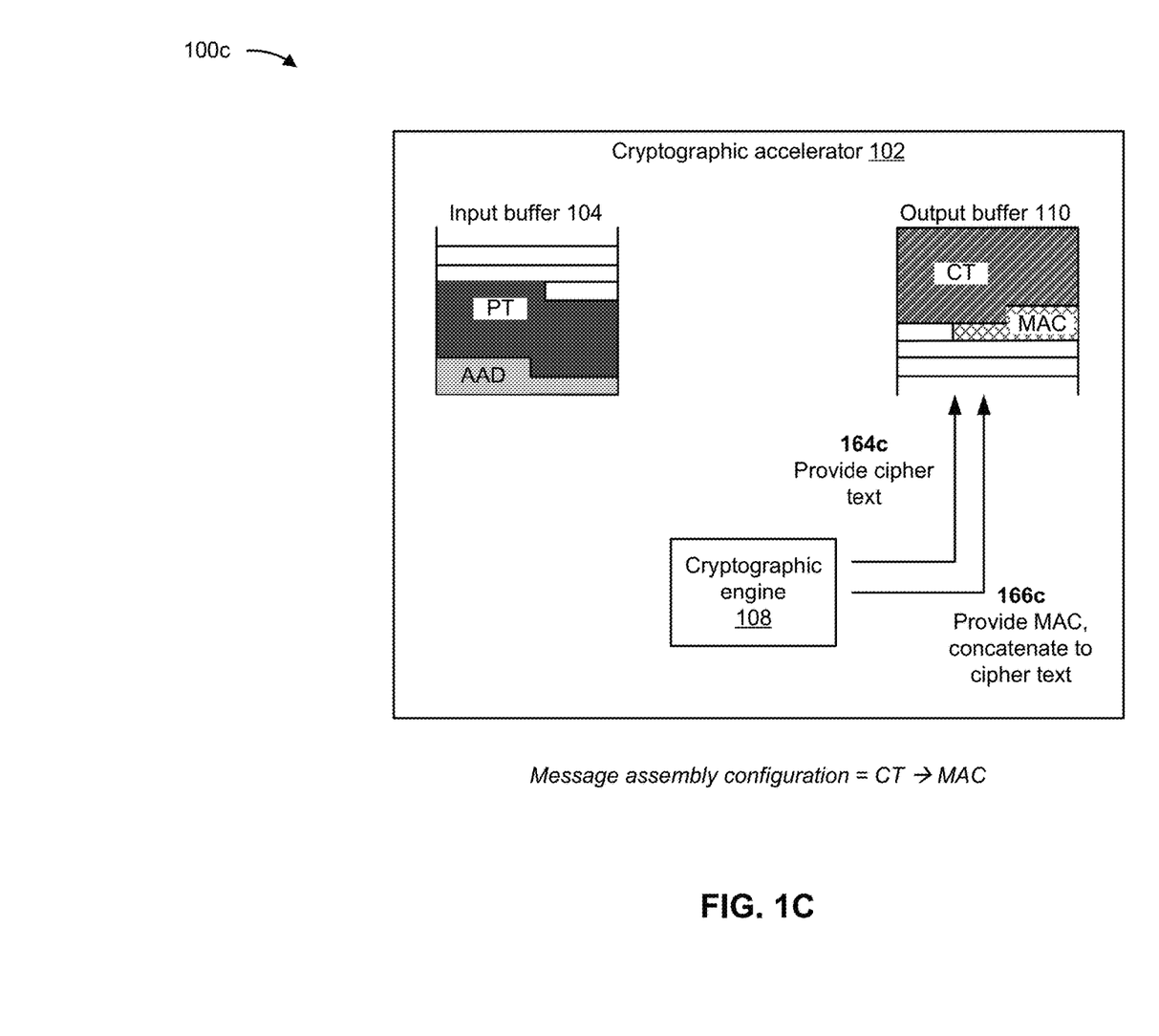

In some implementations, the message assembly configuration indicates that the assembled message is to consist of the cipher text and the MAC. FIG. 1C illustrates message assembly in an example 100c in which the message assembly configuration indicates that the assembled message is to consist of the cipher text and the MAC.

As shown by reference 164c, cryptographic engine 108 may provide the cipher text to output buffer 110. As shown by reference 166c, cryptographic engine 108 may then provide the MAC to output buffer 110. Here, cryptographic engine 108 provides the MAC to output buffer 110 such that the MAC is concatenated to the cipher text in output buffer 110. In this way, cryptographic engine 108 may create the assembled message in output buffer 110 such that the assembled message consists of the cipher text and the MAC, with the MAC being concatenated to the cipher text.

Figure 1D:
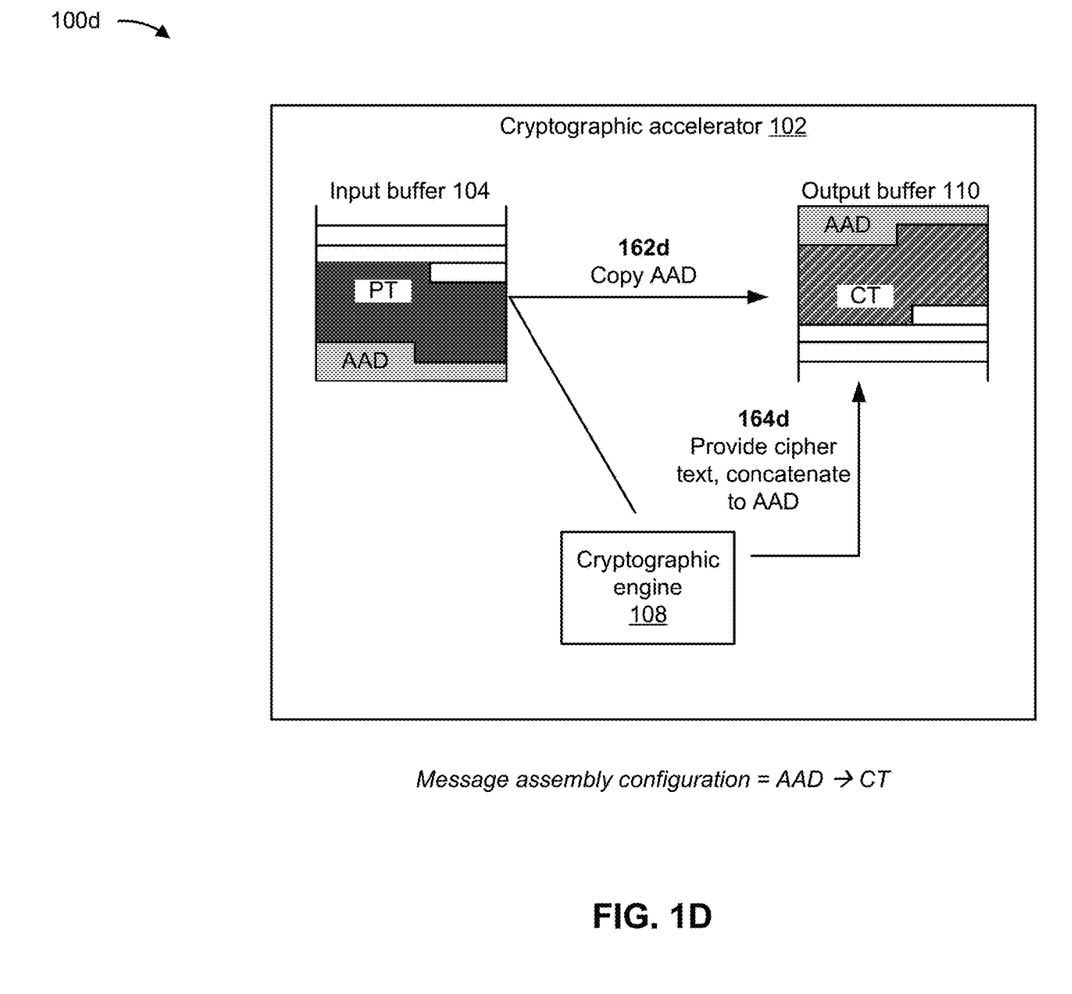

In some implementations, the message assembly configuration indicates that the assembled message is to consist of the AAD portion and the cipher text. FIG. 1D illustrates message assembly in an example 100d in which the message assembly configuration indicates that the assembled message is to consist of the AAD portion and the cipher text.

As shown by reference 162d, based on the message assembly configuration indicating that the assembled message is to consist of the AAD portion and the cipher text, cryptographic engine 108 may copy the AAD portion, or cause the AAD portion to be copied, to output buffer 110. As shown by reference 164d, cryptographic engine 108 may then provide the cipher text to output buffer 110. Here, cryptographic engine 108 provides the cipher text to output buffer 110 such that the cipher text is concatenated to the AAD portion in output buffer 110. In this way, cryptographic engine 108 may create the assembled message in output buffer 110 such that the assembled message consists of the AAD portion and the cipher text, with the cipher text being concatenated to the AAD portion.

Figure 1E:
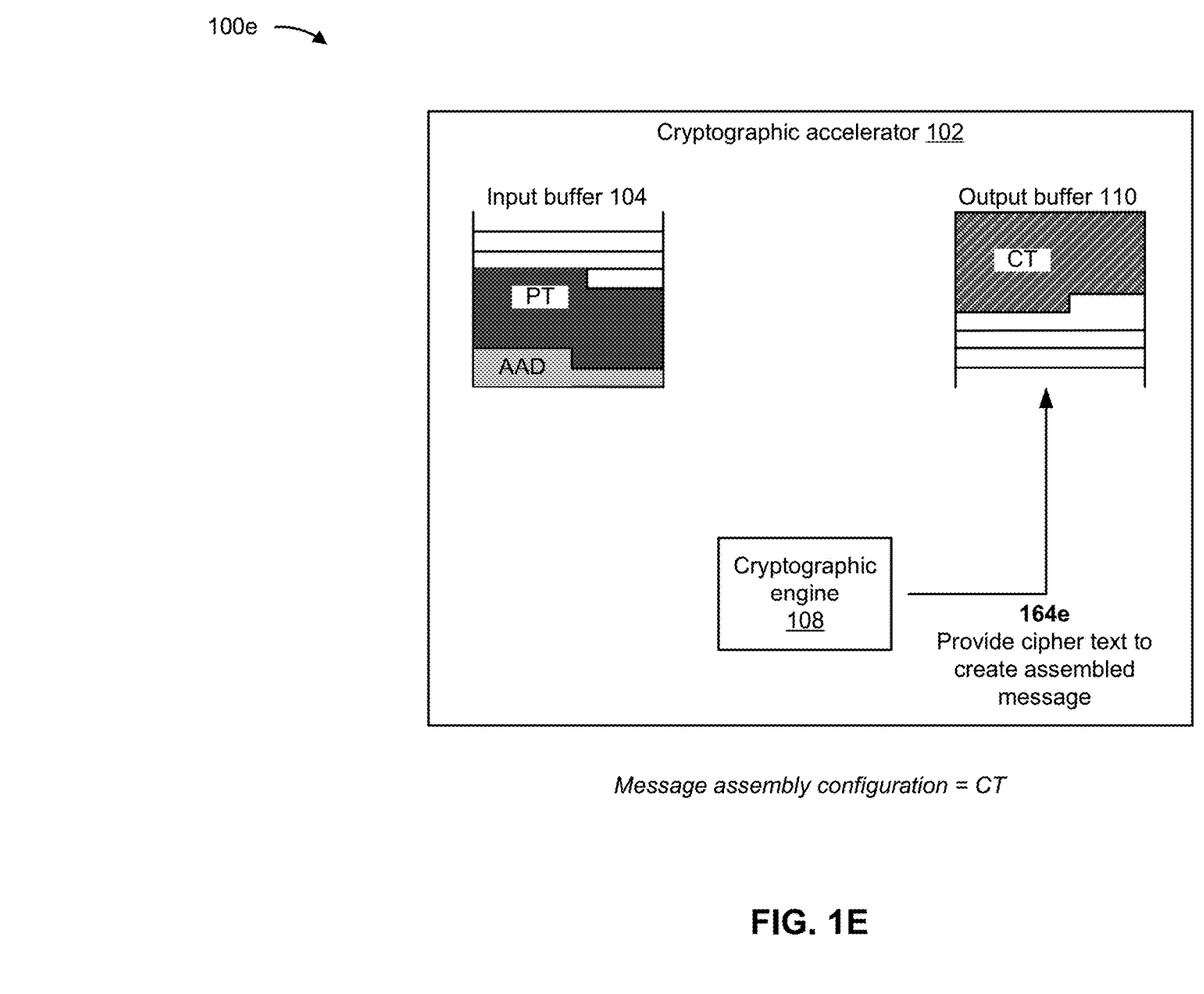

In some implementations, the message assembly configuration indicates that the assembled message is to consist of the cipher text only. FIG. 1E illustrates message assembly in an example 100e in which the message assembly configuration indicates that the assembled message is to consist of the cipher text only. As shown by reference 164e, cryptographic engine 108 may provide the cipher text to output buffer 110.

In this way, cryptographic engine 108 may create the assembled message in output buffer 110 such that the assembled message consists of the cipher text only.

In some implementations, output buffer 110 may provide the assembled message after the assembled message is created in output buffer 110 by cryptographic engine 108. For example, output buffer 110 may provide the assembled message to a communication component of the system. Here, the communication component may receive the assembled message, and may transmit the assembled message (e.g., to another device or system). Notably, when the assembled message is read from output buffer 110 (e.g., via a DMA, via software, or the like) the fully assembled message is provided, due to the concatenation of the message parts within output buffer 110.

As indicated above, FIGS. 1A-1E are provided as an example. Other examples may differ from what is described with regard to FIGS. 1A-1E. The number and arrangement of components shown in FIGS. 1A-1E are provided as an example. In practice, there may be additional components, fewer components, different components, or differently arranged components than those shown in FIGS. 1A-1E. Furthermore, two or more components shown in FIGS. 1A-1E may be implemented within a single component, or a single component shown in FIGS. 1A-1E may be implemented as multiple, distributed components. Additionally, or alternatively, a set of components (e.g., one or more components) shown in FIGS. 1A-1E may perform one or more functions described as being performed by another set of components shown in FIGS. 1A-1E.

Figure 2A:
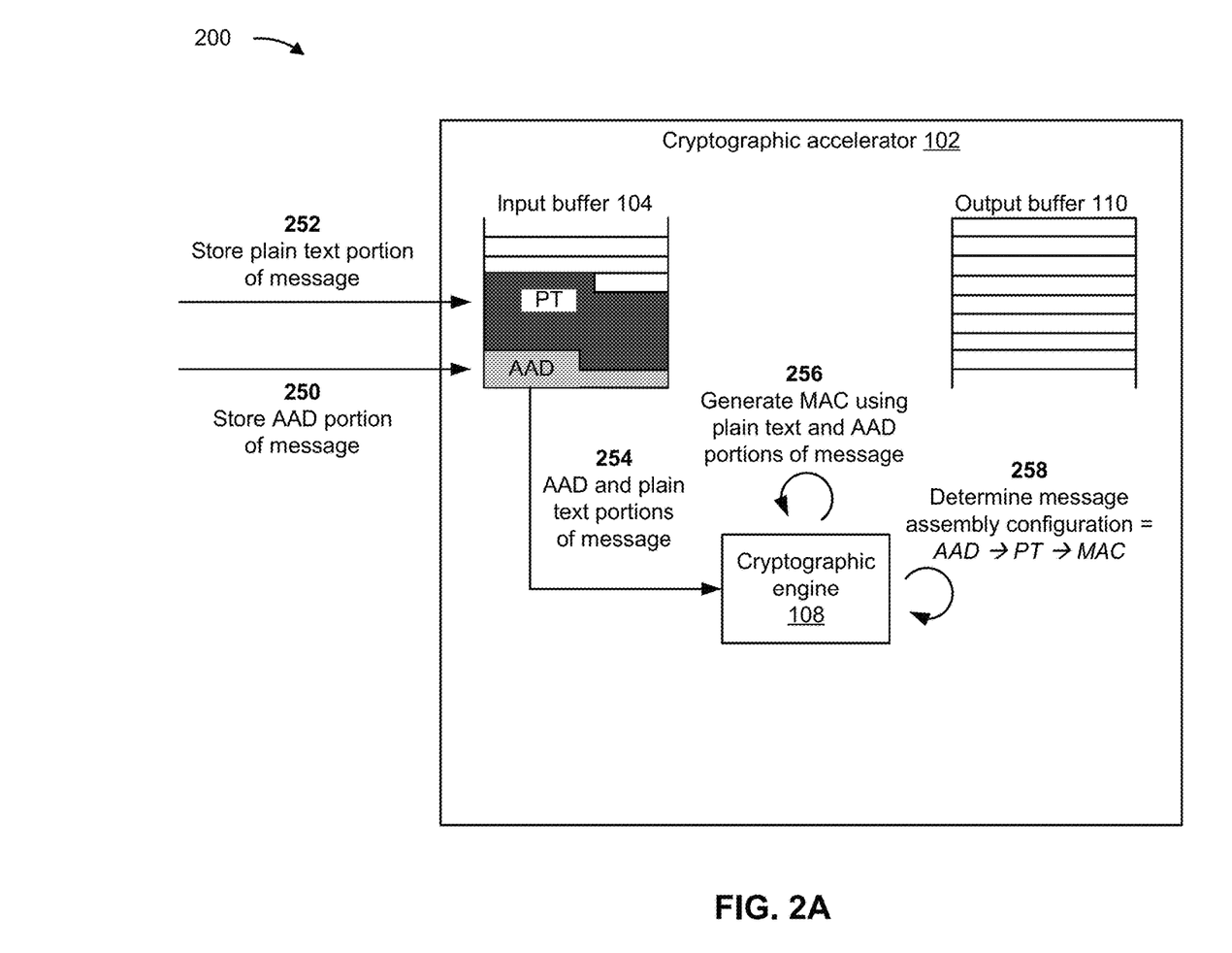
FIGS. 2A and 2B are diagrams illustrating another example associated with automatic message assembly during a cryptographic operation, in accordance with various aspects of the present disclosure.
Figure 2B:
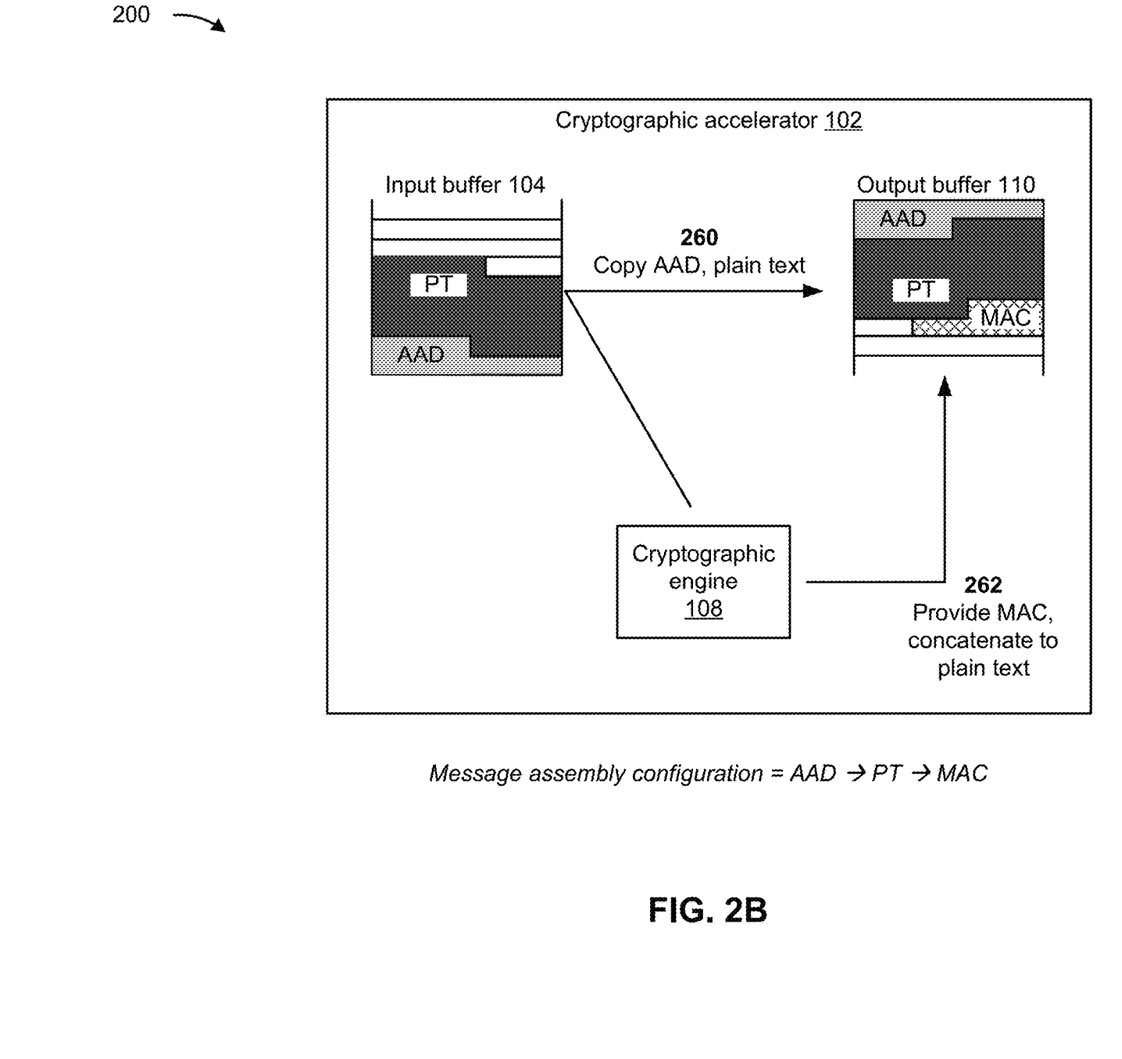

FIGS. 2A and 2B are diagrams illustrating an example 200 of automatic message assembly during a cryptographic operation, in accordance with various aspects of the present disclosure.

As shown in FIGS. 2A and 2B, example 200 includes a cryptographic accelerator 102 including an input buffer 104, a cryptographic engine 108, and an output buffer 110. cryptographic accelerator 102 and the various components of cryptographic accelerator 102 are provided below, followed by a description of an example of operation of the cryptographic accelerator 102.

In an example operation, starting with reference 250 in FIG. 2A, input buffer 104 may store an AAD portion of a message. For example, cryptographic accelerator 102 may receive the AAD portion of the message via a DMA component of the system (not shown), and input buffer 104 may store the AAD portion.

As shown by reference 252, input buffer 104 may further store a plain text (PT) portion of the message. For example, cryptographic accelerator 102 may receive the plain text portion of the message via a DMA component of the system (not shown), and input buffer 104 may store the plain text portion.

As shown by reference 254, cryptographic engine 108 may obtain the AAD portion of the message and the plain text portion of the message. For example, cryptographic engine 108 may read the AAD portion of the message from input buffer 104 and may read the plain text portion of the message from input buffer 104. As another example, another component of cryptographic accelerator 102 may read the AAD portion of the message and/or the plain text portion of the message, and may provide the AAD portion of the message and/or the plain text portion of the message to cryptographic engine 108 (e.g., after some processing of the AAD portion of the message and/or the plain text portion of the message).

As shown by reference 256, cryptographic engine 108 may generate a MAC using the AAD portion of the message and either the plain text portion of the message or the cipher text. For example, cryptographic engine 108 may provide the plain text portion of the message and the AAD portion of the message as an input to a MAC algorithm configured on cryptographic engine 108 and may obtain the MAC as an output of the MAC algorithm. As another example, cryptographic engine 108 may provide the cipher text and the AAD portion of the message as an input to a MAC algorithm configured on cryptographic engine 108 and may obtain the MAC as an output of the MAC algorithm. In some implementations, the MAC is generated according to the set of cryptographic configuration parameters configured for cryptographic engine 108, described above.

As shown by reference 258, cryptographic engine 108 may determine a configuration for creating an assembled message in output buffer 110 of cryptographic accelerator 102. The configuration for creating the assembled message in output buffer 110 (herein referred to as a message assembly configuration) is a configuration including information that identifies one or more parts to be included in a message assembled in output buffer 110, as described above. In some implementations, cryptographic engine 108 may determine the message assembly configuration based on a communication protocol to be used to transmit the assembled message and/or based on the set of cryptographic configuration parameters, as described above.

As noted by reference 258, in example 200 the message assembly configuration indicates that the assembled message is to consist of the AAD portion, the plain text portion, and the MAC (i.e., that an authentication-only mode is active).

As shown by reference 260 in FIG. 2B, based on the message assembly configuration indicating that the assembled message is to consist of the AAD portion, the plain text, and the MAC, cryptographic engine 108 may copy the AAD portion and the plain text portion, or cause the AAD portion and the plain text portion to be copied, to output buffer 110. As shown by reference 262, cryptographic engine 108 may then provide the MAC to output buffer 110. Here, cryptographic engine 108 provides the MAC to output buffer 110 such that the MAC is concatenated to the plain text portion in output buffer 110. In this way, cryptographic engine 108 may create the assembled message in output buffer 110 such that the assembled message consists of the AAD portion, the plain text portion, and the MAC, with the plain text portion being concatenated to the AAD portion and the MAC being concatenated to the plain text portion.

As indicated above, FIGS. 2A and 2B are provided as an example. Other examples may differ from what is described with regard to FIGS. 2A and 2B. The number and arrangement of components shown in FIGS. 2A and 2B are provided as an example. In practice, there may be additional components, fewer components, different components, or differently arranged components than those shown in FIGS. 2A and 2B. Furthermore, two or more components shown in FIGS. 2A and 2B may be implemented within a single component, or a single component shown in FIGS. 2A and 2B may be implemented as multiple, distributed components. Additionally, or alternatively, a set of components (e.g., one or more components) shown in FIGS. 2A and 2B may perform one or more functions described as being performed by another set of components shown in FIGS. 2A and 2B.

Figure 3:
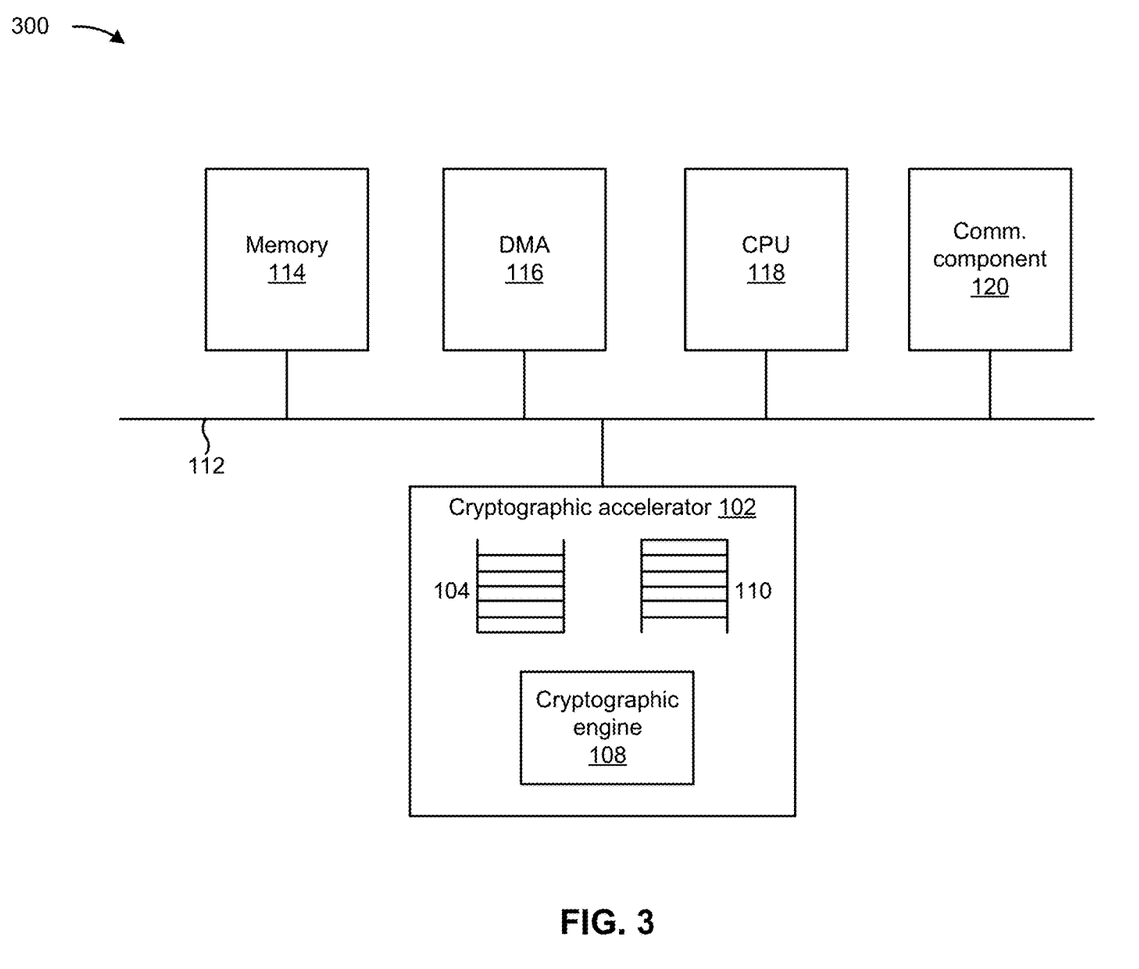
FIG. 3 is a diagram of an example system in which the cryptographic accelerator described herein may be implemented.

FIG. 3 is a diagram of an example system 300 in which cryptographic accelerator 102 may be implemented. In some implementations, system 300 may be an SoC. As shown in FIG. 3, system 300 may include cryptographic accelerator 102, as well as a bus 112, a memory 114, a DMA 116, a CPU 118, and a communication component 120.

Cryptographic accelerator 102 is a component to perform cryptographic operations associated with system 300, as described herein. Further details regarding cryptographic accelerator 102 are provided above with respect to FIGS. 1A-1E.

Bus 112 is a component that enables communication among the components of system 300. For example, bus 112 may enable cryptographic accelerator 102 to receive data from memory 114 and/or DMA 116. As another example, bus 112 may enable cryptographic accelerator 102 to transmit data to communication component 120.

Memory 114 is a component to store and provide portions of a message to be processed by cryptographic accelerator 102. For example, memory 114 may store an AAD portion of a message, a plain text portion of the message, or the like, as described herein. In some implementations, memory 114 may be include a RAM, a read only memory (ROM), and/or another type of memory (e.g., a flash memory, a magnetic memory, and/or an optical memory).

DMA 116 is a component to provide data stored by memory 114 to cryptographic accelerator 102 (e.g., data including a portion of a message stored by memory 114). In some implementations, DMA 116 provides data stored by memory 114 to cryptographic accelerator 102 independent of CPU 118 (i.e., DMA 116 provides direct memory access).

CPU 118 includes a central processing unit, a graphics processing unit, a microprocessor, a controller, a microcontroller, a digital signal processor, a field-programmable gate array, an application-specific integrated circuit, and/or another type of processing component. In some implementations, CPU 118 is implemented in hardware, firmware, or a combination of hardware and software. In some implementations, CPU 118 includes one or more processors capable of being programmed to perform a function.

The number and arrangement of components shown in FIG. 3 are provided as an example. In practice, there may be additional components, fewer components, different components, or differently arranged components than those shown in FIG. 3. For example, system 300 may include a communication component (e.g., a receiver, a transmitter, a transceiver, a modem, or the like) that enables system 300 to communicate with other devices or systems. Furthermore, two or more components shown in FIG. 3 may be implemented within a single component, or a single component shown in FIG. 3 may be implemented as multiple, distributed components. Additionally, or alternatively, a set of components (e.g., one or more components) of system 300 may perform one or more functions described as being performed by another set of components of system 300.

Figure 4:
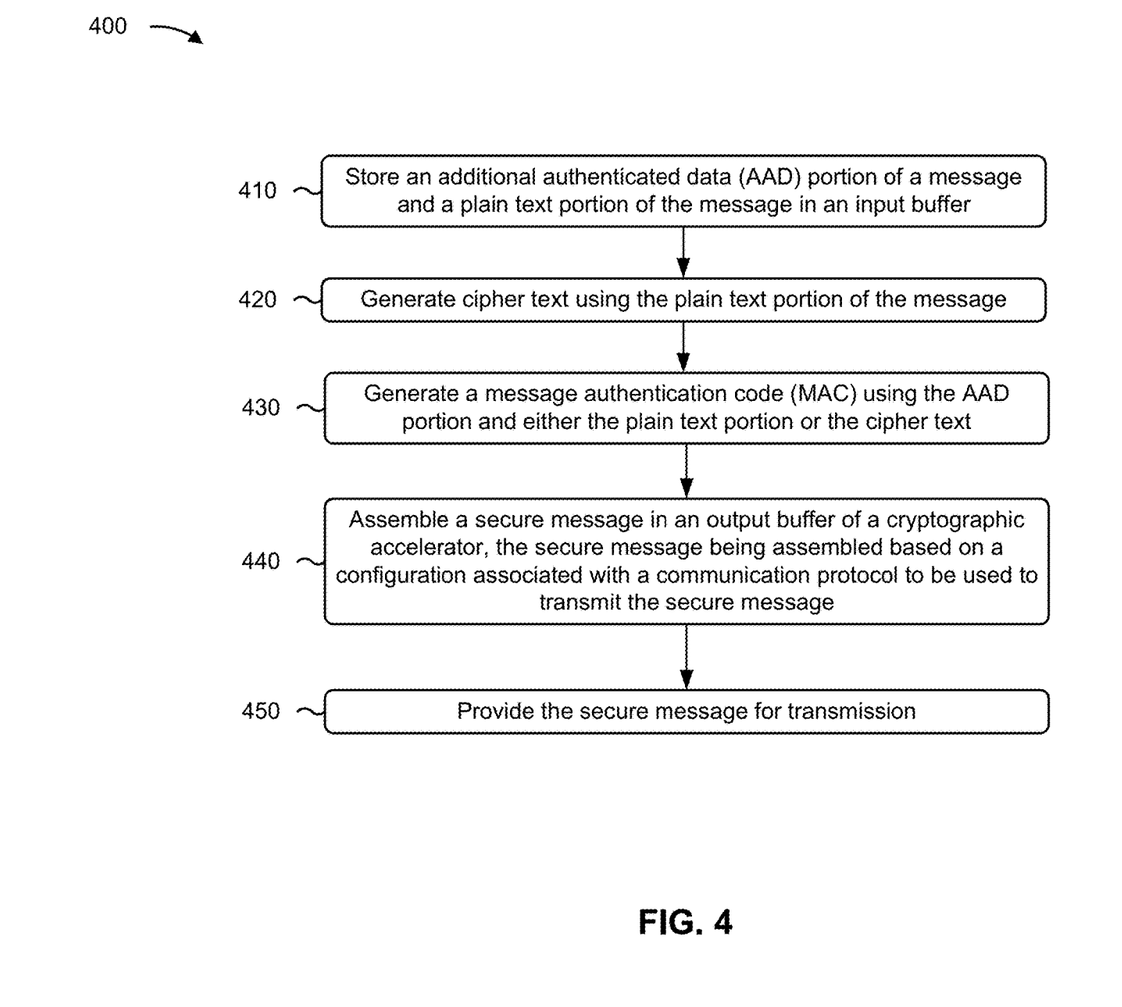
FIG. 4 is a flowchart of an example process relating to automatic message assembly during a cryptographic operation, in accordance with various aspects of the present disclosure.

FIG. 4 is a flowchart of an example process 400 relating to automatic message assembly during a cryptographic operation. In some implementations, one or more process blocks of FIG. 4 may be performed by a cryptographic accelerator (e.g., cryptographic accelerator 102).

As shown in FIG. 4, process 400 may include storing an AAD portion of a message and a plain text portion of the message in an input buffer (block 410). For example, the cryptographic accelerator may store an AAD portion of a message and a plain text portion of the message in an input buffer (e.g., using input buffer 104), as described above.

As further shown in FIG. 4, process 400 may include generating cipher text using the plain text portion of the message (block 420). For example, the cryptographic engine may (e.g., using cryptographic engine 108) generate cipher text using the plain text portion of the message, as described above.

As further shown in FIG. 4, process 400 may include generating a MAC using the AAD portion and either the plain text portion or the cipher text (block 430). For example, the cryptographic accelerator may (e.g., using cryptographic engine 108) generate a MAC using the AAD portion and either the plain text portion or the cipher text, as described above.

As further shown in FIG. 4, process 400 may include assembling a secure message in an output buffer of a cryptographic accelerator, the secure message being assembled based on a configuration associated with a communication protocol to be used to transmit the secure message (block 440). For example, the cryptographic accelerator (e.g., using cryptographic engine 108) may assemble a secure message in an output buffer (e.g., output buffer 110) of the cryptographic accelerator, the secure message being assembled based on a configuration associated with a communication protocol to be used to transmit the secure message, as described above. In some implementations, assembling the secure message in the output buffer includes providing at least the cipher text to the output buffer.

As further shown in FIG. 4, process 400 may include providing the secure message for transmission (block 450). For example, the cryptographic accelerator (e.g., using output buffer 110) may provide the secure message for transmission, as described above.

Process 400 may include additional implementations, such as any single implementation or any combination of implementations described below and/or in connection with one or more other processes described elsewhere herein.

In a first implementation, assembling the secure message in the output buffer further comprises copying the AAD portion to the output buffer, wherein the cipher text is provided to the output buffer such that the cipher text is concatenated to the AAD portion in the output buffer.

In a second implementation, alone or in combination with the first implementation, assembling the secure message in the output buffer further comprises providing the MAC to the output buffer such that the MAC is concatenated to the cipher text in the output buffer.

In a third implementation, alone or in combination with one or more of the first and second implementations, process 400 includes determining the configuration based on the communication protocol to be used to transmit the secure message.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, and/or a combination of hardware and software.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A cryptographic accelerator, comprising:
an input buffer to store an additional authenticated data (AAD) portion of a message and a plain text portion of the message;
a cryptographic engine to:
generate cipher text using the plain text portion of the message,
generate a message authentication code (MAC) using the AAD portion and either the plain text portion or the cipher text,
identify a communication protocol, of a plurality of communication protocols, used to transmit an assembled message,
determine a particular configuration, of a plurality of configurations, for creating the assembled message based on the communication protocol,
wherein the plurality of configurations includes:
a first configuration indicating that the assembled message is to consist of a first combination of at least one of the AAD portion, the plain text portion, the cipher text, or the MAC, and
a second configuration indicating that the assembled message is to consist of a second combination of at least one of the AAD portion, the plain text portion, the cipher text, or the MAC, the second configuration being different from the first configuration, and
provide a third configuration of at least one of the cipher text, the AAD portion, or the MAC according to the particular configuration; and
an output buffer to:
receive the third configuration of the at least one of the cipher text, the AAD portion, or the MAC according to the particular configuration,
create the assembled message in the output buffer according to the particular configuration, and
provide the assembled message based on creating the assembled message.

2. The cryptographic accelerator of claim 1, wherein the particular configuration indicates that the assembled message is to consist of the AAD portion, the cipher text, and the MAC.

3. The cryptographic accelerator of claim 2, wherein the cryptographic engine, to provide the third combination of the at least one of the cipher text, the AAD portion, or the MAC according to the particular configuration, is to:
copy the AAD portion to the output buffer,
provide the cipher text to the output buffer such that the cipher text is concatenated to the AAD portion in the output buffer, and
provide the MAC to the output buffer such that the MAC is concatenated to the cipher text in the output buffer.

4. The cryptographic accelerator of claim 1, wherein the particular configuration indicates that the assembled message is to consist of the cipher text and the MAC.

5. The cryptographic accelerator of claim 4, wherein the cryptographic engine, to provide the third combination of the at least one of the cipher text, the AAD portion, or the MAC according to the particular configuration, is to:
provide the cipher text to the output buffer, and
provide the MAC to the output buffer such that the MAC is concatenated to the cipher text in the output buffer.

6. The cryptographic accelerator of claim 1, wherein the particular configuration indicates that the assembled message is to consist of the AAD portion and the cipher text.

7. The cryptographic accelerator of claim 6, wherein the cryptographic engine, to provide the third combination of the at least one of the cipher text, the AAD portion, or the MAC according to the particular configuration, is to:
copy the AAD portion to the output buffer, and
provide the cipher text to the output buffer such that the cipher text is concatenated to the AAD portion in the output buffer.

8. The cryptographic accelerator of claim 1, wherein the particular configuration indicates that the assembled message is to consist of the cipher text.

9. The cryptographic accelerator of claim 8, wherein the cryptographic engine, to provide the third combination of the at least one of the cipher text, the AAD portion, or the MAC according to the particular configuration, is to provide only the cipher text to the output buffer.

10. The cryptographic accelerator of claim 1, wherein each of the plurality of configurations maps to a particular communication protocol of the plurality of communication protocols.

11. A system, comprising:
a cryptographic accelerator comprising:
an input buffer to store an additional authenticated data (AAD) portion of a message and a plain text portion of the message in an input buffer;
a cryptographic engine to:
generate cipher text using the plain text portion of the message,
generate a message authentication code (MAC) using the AAD portion and either the plain text portion or the cipher text,
identify a communication protocol, of a plurality of communication protocols, used to transmit an assembled message,
determine a particular configuration, of a plurality of configurations, for creating an assembled message based on the communication protocol,
wherein the plurality of configurations includes:
a first configuration indicating that the assembled message is to consist of a first combination of at least one of the AAD portion, the plain text portion, the cipher text, or the MAC, -and
a second configuration indicating that the assembled message is to consist of a second combination of at least one of the AAD portion, the plain text portion, the cipher text, or the MAC, the second configuration being different from the first configuration, and
provide a third configuration of at least one of the cipher text, the AAD portion, or the MAC according to the particular configuration;
an output buffer to:
receive the third configuration of the at least one of the cipher text, the AAD portion, or the MAC according to the particular configuration;
create an assembled message in the output buffer based on the particular configuration, the assembled message including at least the cipher text, and
provide the assembled message for transmission; and
a communication component to:
receive the assembled message, and
transmit the assembled message.

12. The system of claim 11, wherein the cryptographic accelerator, to provide the third combination of the at least one of the cipher text, the AAD portion, or the MAC according to the particular configuration, is to:
copy the AAD portion to the output buffer,
provide the cipher text to the output buffer such that the cipher text is concatenated to the AAD portion in the output buffer, and
provide the MAC to the output buffer such that the MAC is concatenated to the cipher text in the output buffer.

13. The system of claim 11, wherein the cryptographic accelerator, to provide the third combination of the at least one of the cipher text, the AAD portion, or the MAC according to the particular configuration, is to:
provide the cipher text to the output buffer, and
provide the MAC to the output buffer such that the MAC is concatenated to the cipher text in the output buffer.

14. The system of claim 11, wherein the cryptographic accelerator, to provide the third combination of the at least one of the cipher text, the AAD portion, or the MAC according to the particular configuration, is to:
copy the AAD portion to the output buffer, and
provide the cipher text to the output buffer such that the cipher text is concatenated to the AAD portion in the output buffer.

15. The system of claim 11, wherein the cryptographic accelerator, to provide the third combination of the at least one of the cipher text, the AAD portion, or the MAC according to the particular configuration, is to provide only the cipher text to the output buffer.

16. The system of claim 11, wherein each of the plurality of configurations maps to a particular communication protocol of the plurality of communication protocols.

17. A method, comprising:
storing, in an input buffer of a cryptographic accelerator, an additional authenticated data (AAD) portion of a message and a plain text portion of the message;
generating, in a cryptographic engine of the cryptographic accelerator, cipher text using the plain text portion of the message;
generating, in the cryptographic engine, a message authentication code (MAC) using the AAD portion and either the plain text portion or the cipher text;
identifying, in the cryptographic engine, a communication protocol, of a plurality of communication protocols, used to transmit an assembled message,
determining, in the cryptographic engine, a particular configuration, of a plurality of configurations, for creating the assembled message based on the communication protocol,
wherein the plurality of configurations includes:
a first configuration indicating that the assembled message is to consist of a first combination of at least one of the AAD portion, the plain text portion, the cipher text, or the MAC, and
a second configuration indicating that the assembled message is to consist of a second combination of at least one of the AAD portion, the plain text portion, the cipher text, or the MAC, the second configuration being different from the first configuration;
assembling, in an output buffer of the cryptographic accelerator, a secure message based on the particular configuration; and
providing the secure message for transmission.

18. The method of claim 17, wherein assembling the secure message in the output buffer further comprises copying the AAD portion to the output buffer,
wherein the cipher text is provided to the output buffer such that the cipher text is concatenated to the AAD portion in the output buffer.

19. The method of claim 17, wherein assembling the secure message in the output buffer further comprises providing the MAC to the output buffer such that the MAC is concatenated to the cipher text in the output buffer.

20. The method of claim 17, each of the plurality of configurations maps to a particular communication protocol the plurality of communication protocols.

21. A cryptographic accelerator, comprising:
an input buffer to store an additional authenticated data (AAD) portion of a message and a plain text portion of the message;
a cryptographic engine to:
generate a message authentication code (MAC) using the AAD portion and the plain text portion,
identify a communication protocol, of a plurality of communication protocols, used to transmit an assembled message,
determine a particular configuration, of a plurality of configurations, for creating the assembled message based on the communication protocol,
wherein the plurality of configurations includes:
a first configuration indicating that the assembled message is to consist of a first combination of at least one of the AAD portion, the plain text portion, or the MAC, and
a second configuration indicating that the assembled message is to consist of a first combination of at least one of the AAD portion, the plain text portion, or the MAC, and
provide the AAD portion, the plain text portion, and the MAC according to the particular configuration; and
an output buffer to:
receive the AAD portion, the plain text portion, and the MAC;
create the assembled message in the output buffer according to the particular configuration; and
provide the assembled message based on creating the assembled message.

* * * * *